United States Patent [19]

Sommerville

[11] 4,015,570

[45] Apr. 5, 1977

[54] LIQUID-FUEL VAPORIZER

[76] Inventor: S. Smith Sommerville, 6305 Old Stage Road, Raleigh, N.C. 27603

[22] Filed: July 28, 1975

[21] Appl. No.: 599,889

[52] U.S. Cl. .............................. 123/133; 123/134; 123/122 E; 261/DIG. 55; 261/DIG. 21

[51] Int. Cl.$^2$ ........................................ F02M 31/00

[58] Field of Search ........... 123/122 A, 122 E, 133, 123/134, 34, 34 A; 261/144, DIG. 55, DIG. 21; 48/180 R, 180 H

[56] References Cited

UNITED STATES PATENTS

| 920,231 | 5/1909 | White | 261/144 |
|---|---|---|---|
| 1,431,327 | 10/1922 | Perry | 261/DIG. 55 |
| 1,734,723 | 11/1929 | Gildehaus | 261/DIG. 55 |
| 2,103,126 | 12/1937 | Sugihara | 123/139 BG |
| 3,053,242 | 9/1962 | Arpaia | 123/122 AA |

FOREIGN PATENTS OR APPLICATIONS

| 1,241,991 | 1/1968 | United Kingdom | 261/DIG. 55 |
|---|---|---|---|
| 116,970 | 7/1918 | United Kingdom | 261/DIG. 55 |

*Primary Examiner*—Ronald H. Lazarus

[57] ABSTRACT

The present invention replaces the conventional fuel pump and carburetor and is designed to mechanically change liquid gasoline to a vapor state and allow/direct vapor into engine intake air stream, wherein the vaporized fuel mixes with the air to form an air-fuel mixture. The apparatus is provided with a series of electric controlled solenoids that control nozzles that spray pressurized fuel from a fuel supply pump. This spray is allowed/directed into aforesaid intake air stream of associated engine.

9 Claims, 3 Drawing Figures

LIQUID-FUEL VAPORIZER

Vaporization is accomplished by the following functions:
1. Spray through nozzles caused by pump pressure.
2. Adiabatically (natural affinity of oxygen and gasoline vapors to mix).
3. Heat from engine coolant is primarily used to prevent ice formation but some natural vaporization will occur—an enhancement.

To further enhance fuel vaporization and efficiency, there is provided a convex, curved baffle assembly that extends above and over the raised air-born opening and just below the nozzles. This baffle assembly is heated by engine coolant or exhaust gases—directed through a series of pipes, the heat to prevent ice formation. In addition, the baffle assembly is so structured and configured to intercept any droplets of nonvaporized fuel and cause same to be directed to circumferential, annular trough and basin, where it is recaptured and recirculated to fuel supply pump. Hence only total dry vapor will be allowed into engine intake air stream.

Fuel requirements to meet power/speed demands of associated engine are more precisely attained by a step-switch, properly attached and staged to the accelerator-operated throttle plate. The step-switch opens or closes the electric solenoid fuel valves and the throttle plate is the final controller of the engine.

BACKGROUND OF THE INVENTION

Gasoline powered (now known as motor gasoline) internal combustion engines are fueled at a ratio of 12 to 15% to 1.00, 15 parts air to 1 part gasoline. This optimum mixture is sought to be accomplished by using: idle jet(s), intermediate jet(s)—primary jet(s). These are in concert use or staged use as the throttle plate is opened or closed, to meet the power/speed demands of the engine. Hence I describe the ordinary carburetor and its operation.

This has several disadvantages:
1. Consistency of fuel varies (more or less tendency to vaporize).
2. Temperature variance—weather, engine block, ambient—surrounding or passing air.
3. Power/speed demands of engine and vehicular load—cold-start, hot-run; start, accelerate, decelerate, stop and idle.

Consider the aforementioned disadvantages and the fact that the jets are "feeding" fuel at a constant and predetermined rate and in actual performance, there is a waste of 15 to 40%. The waste is more when engine is operating at cold or warm conditions with load variance; less when operating hot and at steady power demand. The main cause of this waste is droplets of nonvapor gasoline or recondensed gasoline "flooding" past the intake valves and down the piston walls or being blown out the exhaust system. The above mentioned disadvantages and variations are inherent in ordinary carburetors.

The fuel vaporizer of the present invention will mechanically change liquid gasoline to a vapor state, using pressure and spray nozzles, radiator-coolant-heated baffles and liquid traps. Too, it will:
1. Meter and stage the fuel to product a more precise, matching of fuel to air ratio to varying power/speed demands of engine.
2. Aforementioned baffles and liquid traps will entrain and recycle droplets of liquid and recondensed gasoline and allow only dry, vapor fuel to enter.
3. Stop or start fuel flow, instantly and stage same to engine demands, using solenoid valves that will operate through linkage attached to throttle plate. (The throttle plate being the prime engine speed controller. Staging will be accomplished by a step-switch.)
4. Baffles will be heated with engine block—coolant and/or exhaust heat. This will counteract only ice formation and provide secondary vaporization.
5. Battery powered motor will drive pump that will deliver fuel from vehicle storage tank and pressurize to supply spray nozzles (pump will allow instant engine start).
6. This apparatus is meant to replace conventional engine fuel pump and carburetor. It uses proven, simple, sturdy and dependable components and will operate reliably with minimum maintenance. It will adapt to any carburetor equipped engine without any major changes or retooling.

The use of pressure (approximately 100 psi guage. This is arbitrary); spray nozzles, step-staged with solenoid valves; baffles so shaped, spaced arranged and so heated, is the sole idea of this Inventor. The major components of the liquid-fuel vaporizer are readily available in the American Heating and Air Conditioning Parts Market but are used on totally unrelated apparatuses. The application and assembly, thus arranged, is the result of years of experience, thought and testing—and is claimed to be new and novel. Therefore I pray for issuance of Letters Patent on the use, assembly and overall combination of thus shown, applied and described components, this method.

SUMMARY OF THE INVENTION

The present invention relates to a fuel vaporizing apparatus that is adapted to inject fuel into a main system of air passing therethrough in an atomized state and to efficiently vaporize the fuel prior to combustion of the air-fuel mixture within the combustion chambers of an associated fuel consuming engine. In addition, the fuel vaporizing apparatus of the present invention is designed with a series of baffle assemblies below the fuel injection area that acts to intercept droplets of fuel not substantially vaporized and to urge the same from the system of air passing through the fuel vaporizing apparatus where the fuel droplets fall into the fuel catch basin formed therein. Once these nonvaporized fuel droplets are captured and fuel accumulates within the fuel catch basin, a float actuated valve within the catch basin is operative to open such that the accumulated fuel within the catch basin is returned to the fuel supply system furnishing fuel to the fuel vaporizing apparatus of the present invention.

A series of stage actuated nozzles are operatively connected to a fuel supply and project interiorly of the fuel vaporizing apparatus whereupon in operation fuel is pumped to the respective nozzles and sprayed into the fuel vaporizing apparatus in an atomized state where the atomized fuel mixes with a system of air being pulled downwardly through a housing structure of the fuel vaporizing apparatus.

To enhance fuel vaporization, a series of hot water pipes extend through the fuel vaporizing apparatus adjacent and in close proximity to the baffle structure extending across the cross sectional area of the fuel vaporizing housing, the hot water or coolant pipes being operatively connected to the cooling system of the associated engine such that the heat associated with the water or coolant fluid passing therethrough is transferred to the adjacent baffle structure and the surrounding area and consequently acts to increase fuel vaporization.

It is, therefore, an object of the present invention to provide a more efficient fuel vaporizing system for a fuel consuming engine.

A further object of the present invention is to provide a fuel vaporizing system designed to positively atomize liquid fuel by spraying the same into the fuel vaporizing system where the atomized fuel may mix with a system of air passing therethrough to form an air-fuel mixture.

Another object of the present invention is to provide a fuel vaporizing system that acts to positively vaporize fuel droplets that may be within the fuel vaporizing system and passing therethrough towards the intake manifold and combustion chambers of the associated engine.

Still a further object of the present invention is to provide a fuel vaporizer or fuel vaporizing system that acts to intercept and capture fuel droplets not substantially vaporized and to return the fuel of the captured fuel droplets back to the fuel supply system where the same fuel can be rerouted back through the fuel vaporizing system where the fuel may once again be sprayed into the fuel vaporizing system in an atomized state and be subjected to the fuel vaporization process of the fuel vaporizing system of the present invention.

A further object of the present invention is to provide a fuel vaporizing system having a step switching mechanism for sequentially or progressively actuating a series of fuel spray nozzles for increasing or decreasing the quantity of fuel sprayed into said fuel vaporizing system relative to the speed and/or power demands of an associated engine.

Still a further object of the present invention is to provide a fuel vaporizing system wherein there is provided a series of water or coolant pipes extending therethrough in close proximity to a baffle assembly extending across a substantial portion of the cross sectional area of said fuel vaporizing system wherein the water or coolant pipes are operatively connected to the cooling system of an associated engine wherein the heat associated with the water or coolant fluid flowing through said pipes is transferred to said baffle assembly and the heated baffle assembly acts to enhance the vaporization of fuel passing through said fuel vaporizing system.

DESCRIPTION OF THE PREFERRED EMBODIMENT

Figure 1:
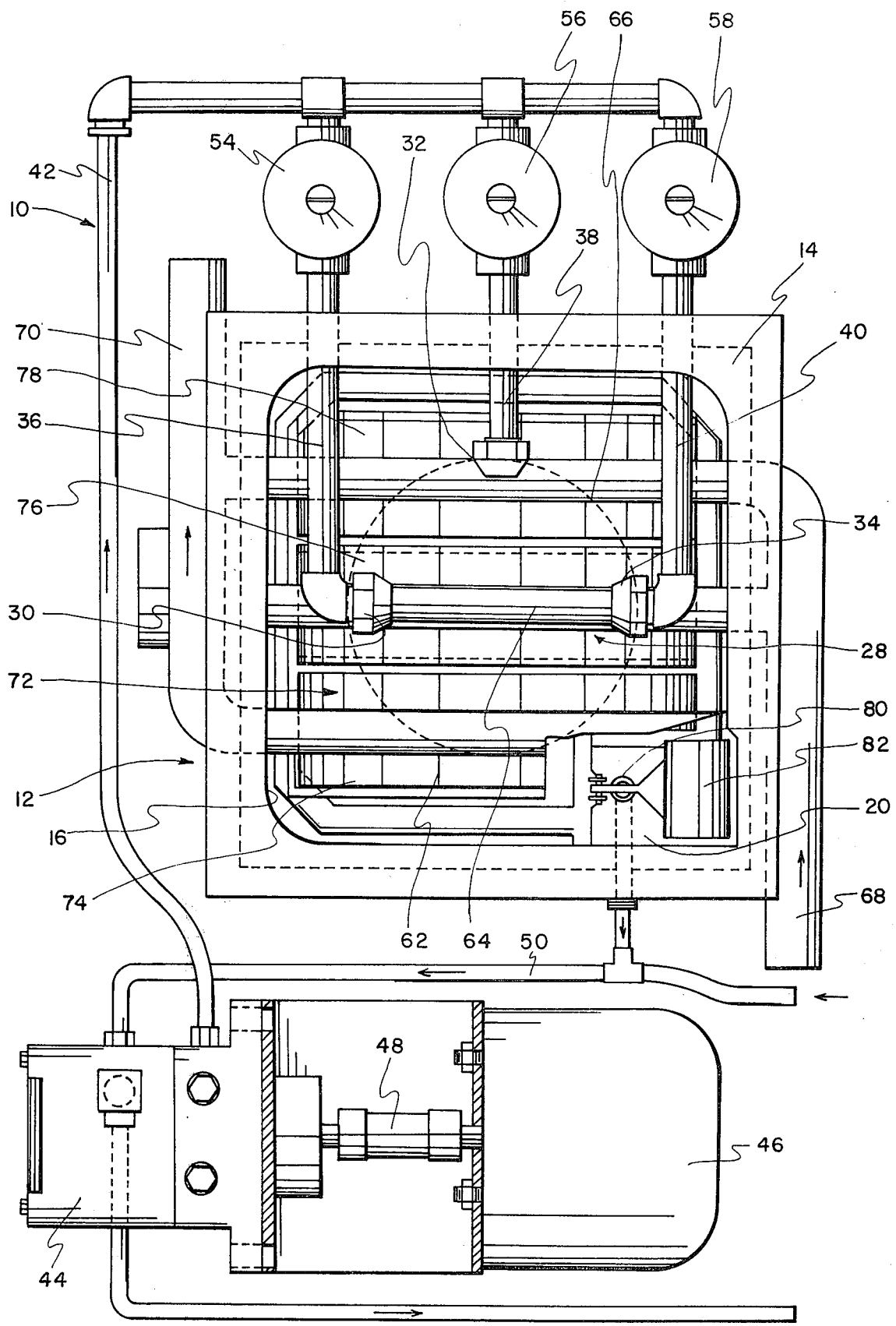
FIG. 1 is a top plan view of the fuel vaporizer of fuel vaporizing system of the present invention.
Figure 2:
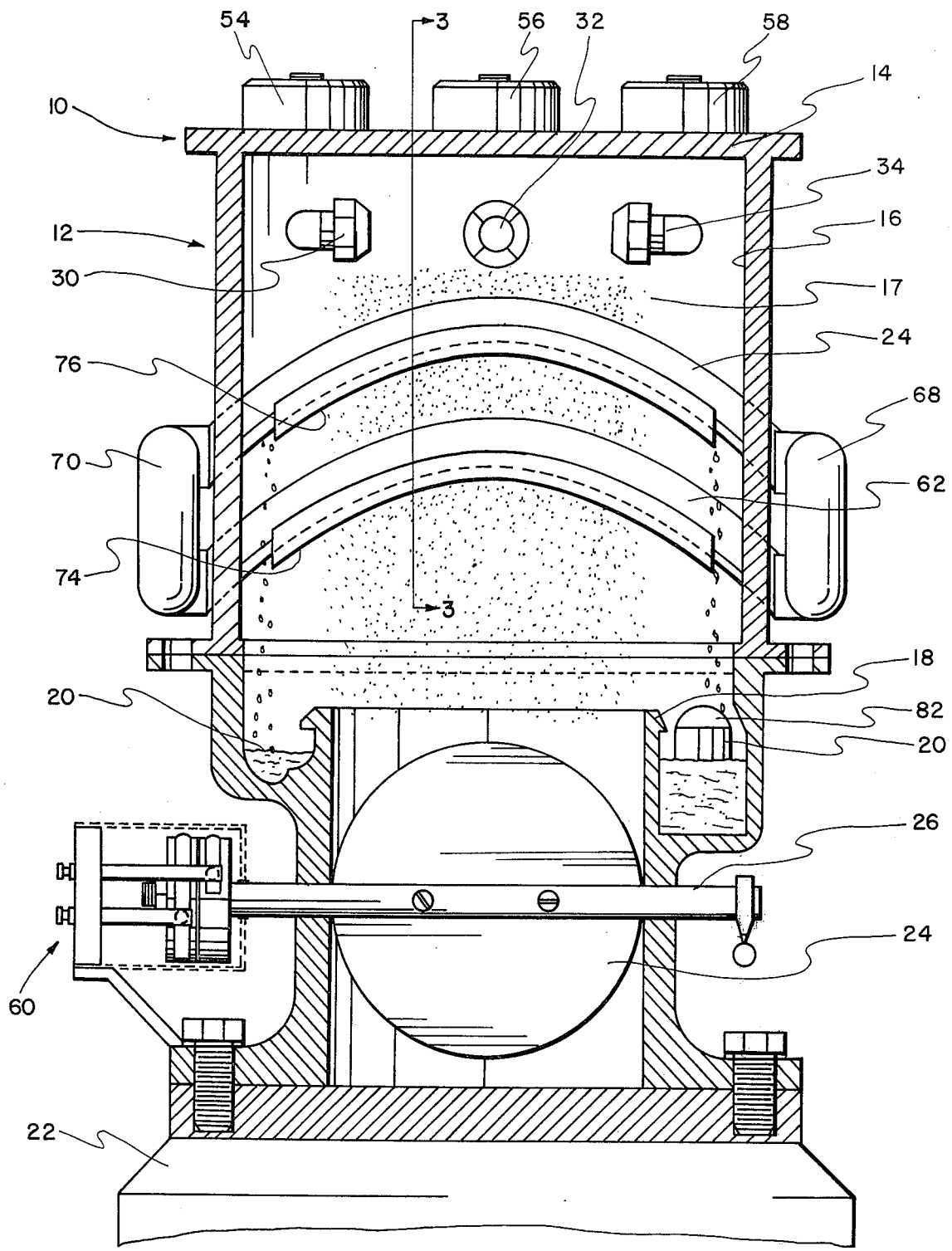
FIG. 2 is a side elevational sectional view of the fuel vaporizer of the present invention.
Figure 3:
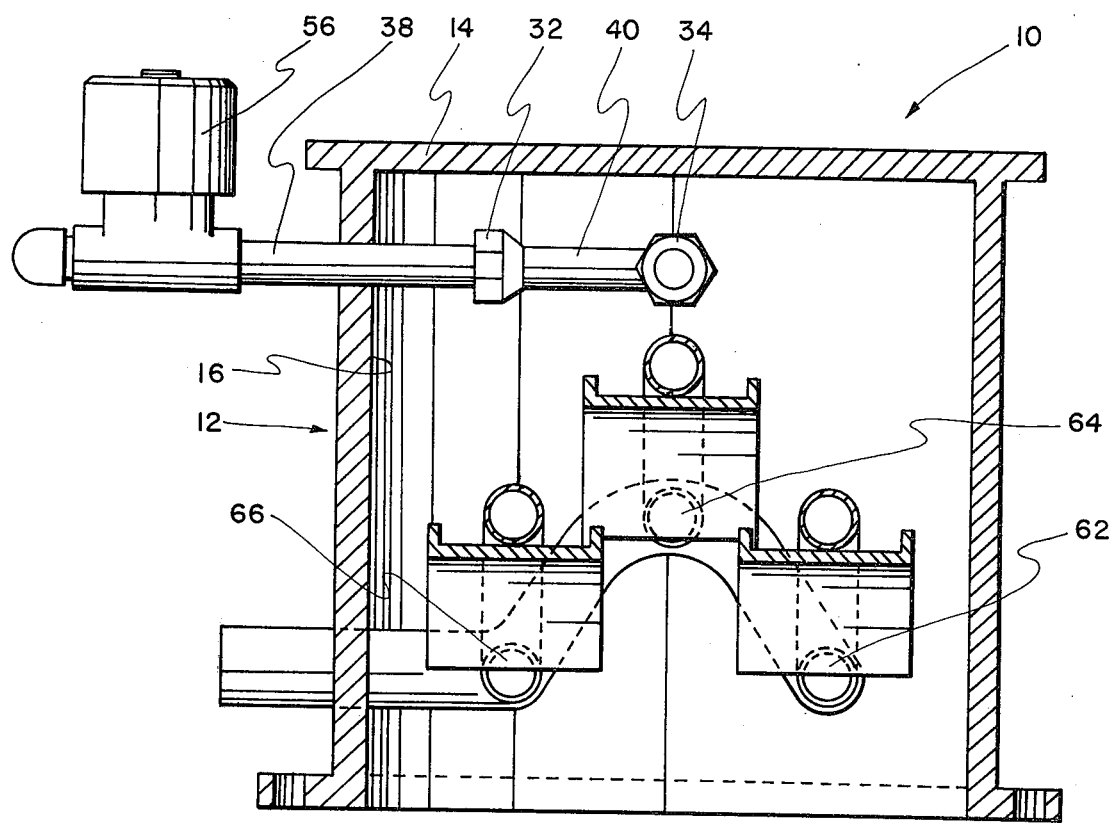
FIG. 3 is a fragmentary sectional of the fuel vaporizer view taken along the line 3—3 of FIG. 2.

With further reference to the drawings, particularly FIGS. 1 and 2, the fuel vaporizing assembly of the present invention is shown therein and indicated generally by the numeral 10. Fuel vaporizer 10 is adapted to be secured about an intake manifold 22 of a fuel consuming engine (not shown) of the conventional internal or external type. Being a fuel metering system, it will be appreciated that due to the engine vacuum a system of air is pulled through the fuel vaporizer 10 and as the system of air moves therethrough, the function of the fuel vaporizer is to add fuel to the air system to form an air-fuel mixture that is eventually received within the combustion chambers of the engine where during the combustion process the pistons of the engine are driven and consequently the engine is driven.

Viewing the fuel vaporizer 10 in greater detail, it is seen that the same includes a housing means indicated generally by the numeral 12 secured to the intake manifold 22 and extending upwardly therefrom. Housing means 12 comprises a top 14 which is opened and consequently allows air to be pulled downwardly therethrough towards the intake manifold 22, and an upper wall area 16 that defines an area therebetween commonly referred to in conventional fuel vaporizers as an air horn 17. Disposed about the lower portion of the housing means 12 is a lower cylindrical air channeling housing 18 that is of a less diameter than the diameter of the upper wall structure 16 and consequently, the lower cylindrical air channeling housing 18 acts as a venturi and allows air to pass therethrough directly into the intake manifold 22.

Formed about the upper outer circumference of the cylindrical air channeling housing 18 is an annular fuel catch basin that extends therearound and as will be understood from subsequent portions of the disclosure functions to catch fuel droplets that are not substantially vaporized in the area of the air horns 17.

Rotatively disposed within the venturi or lower cylindrical air channeling housing 18 is a circular throttle plate 24 of a diameter just slightly less than the diameter of the air channeling housing 18, the throttle plate being fixed to a rotatable shaft 26 journaled within the wall structure of the air channeling housing 18. Rotatable shaft 26 is actuated in conventional fashion by a linkage mechanism (not shown) extending from the shaft 26 to a foot actuated accelerator (not shown) when employed in an automobile.

To supply fuel to the system of air passing downwardly through the housing 12, the fuel vaporizer 10 of the present invention is provided with nozzle means 28 disposed about an upper portion thereof wherein the function of the nozzle means is to spray the liquid fuel in an atomized state into the fuel vaporizer 10 where the atomized fuel mixes with the system of downwardly moving air to form an air-fuel mixture. Viewing the nozzle means 28 in detail, the embodiment disclosed herein shows the use of a series of three nozzles 30, 32 and 34. Each respective nozzle is secured to the remote end of one of a series of feeder lines 36, 38, and 40, extending inwardly through the upper wall 18 of the housing means 12. Feeder lines 36, 38 and 40 join a main fuel supply line 42 that extends from the feeder lines to a pump 44 that is driven via shaft 48 by an electric motor 46. To supply fuel or gasoline to the pump 44, the pump is provided with an inlet fuel line 50 and an outlet fuel line 52, both fuel lines leading to a fuel supply or storage tank (not shown).

Although the fuel vaporizer and fuel supply system of the present invention may operate at various fuel rates and pressures depending on the size of engine being used and the power being generated thereby, it is believed that the pump and motor should be sufficient to change liquid gasoline motor fuel to a vapor or gaseous form and generally it is thought that the system should convey this fuel at approximately 100 psi. The nozzles 30, 32, and 34 can once again be chosen to give the particular angle of spray desired in accordance with the flow rate of fuel to be furnished to the engine and the particular size of the engine in which the fuel vaporizer and fuel system of the present invention is to be utilized. In some cases, it might be desirable to use more or less than three individual spray nozzles as shown in the present disclosure.

In order to efficiently operate the particular engine at various speeds and/or power demands, each of the feeder lines 36, 38 and 40 is provided with one conventional solenoid control valve assembly indicated by the numeral 54, 56, or 58. It is well appreciated that in idling, starting, and increasing engine speed and load that the fuel requirements vary in order to maintain a proper air to fuel ratio. In order to meter and and stage the fuel to the fuel vaporizer in accordance with starting, idling and various speeds and power demands, etc., the fuel vaporizer 10 is provided with a step switching mechanism 60 that is operatively connected to the throttle shaft 26 and actuated thereby, the step switching mechanism 60 being electrically connected to each of the solenoid control valves 54, 56 and 58. Although the details of the step switching mechanism 60 are not shown and described herein in great detail because such devices are well known and such is not directly material to the present invention per se, it should be pointed out that as the throttle plate is moved from a closed to an opened position, i.e., the angular position of the throttle plate is varied, the step switching mechanism 60 functions to actuate various solenoid control valves 54, 56 and 58. To progressively increase the fuel supplied in accordance with the needs of the engine, the step switching mechanism 60 is adapted to sequentially actuate the solenoid control valves 54, 56 and 58 as the needs of the engine dictate and particularly in response to the angular rotation of the throttle plate 24. Consequently, as the angular position of the throttle plate 24 is moved from the closed to the complete opened position (throttle plate disposed in a vertical plane), the step switching mechanism functions to actuate said series of solenoid control valves 54, 56 and 58 such that the quantity of fuel injected into the fuel vaporizer 10 is progressively increased. Conversely, as the throttle plate is closed, the same solenoid control valves are deactuated such that the quantity of fuel injected into the fuel vaporizer progressively decreases in accordance with the general needs of the engine.

It is quite difficult to exactly and continuously precisely control the quantity of fuel injected into the fuel vaporizer over a wide range of operating conditions where the speed of the engine and the power demands vary substantially. Because of this imprecision, it is possible for a portion of the fuel being supplied to the air system passing through the fuel vaporizer to be in droplet form instead of an atomized or vaporized state. Because of the inefficiencies associated with gasoline or fuel in droplet form, it is desirable to either vaporizer the fuel droplets passing through the fuel vaporizer or alternatively, it is desirable to remove these fuel droplets not in a vapor state. The present invention attempts to first vaporize any fuel droplets that may enter the system from the nozzle means 28 by the provision of baffle means indicated generally by the numeral 72 that extends substantially across the entire cross sectional area of the fuel vaporizer housing means 12 between the nozzle means 28 and the top portion of the cylindrical air channeling housing 18. In particular, said baffle means 72 comprises a series of baffle assemblies 74, 76 and 78 with each baffle assembly being generally arcuate shaped with the uppermost elevated portion being centrally disposed between opposite inner walls 16 of the housing means 12. The baffle assembles 74, 76 and 78 are disposed in side-by-side relationship with the centralmost baffle assembly 76 being elevated above the two flanking baffle assemblies 74 and 78. This allows the vaporized or atomized air-fuel mixture passing through the fuel vaporizer to move around the outer edges of the central baffle assembly 76 and downwardly therefrom between the flanking baffle assemblies 74 and 78 and on downwardly through the venturi or central air channeling housing 18.

From the drawings, it is seen that each of the baffle assemblies 74, 76 and 78 are provided with an outer turned up side flange portions and because of the arcuate shape of each of said baffle assemblies, it is seen that a fuel droplet that lands thereon or is intercepted thereby and not otherwise vaporized is urged downwardly towards either left or right-hand sides of the baffle assemblies, as viewed in FIG. 2, to where the fuel droplet, if not finally vaporized, drops from the outer left or right-hand end into the fuel catch basin 20 formed generally under the outer end edges of the baffle assemblies 74, 76 and 78.

As mentioned herein before, it is desirable to attempt to vaporize such fuel droplets and in attempting this, fuel vaporizer 10 of the present invention is provided with a series of water or coolant pipes 62, 64 and 66 that are also generally arcuate shaped, as viewed in FIG. 2 and are disposed above each of the respective baffle assemblies 74, 76 and 78. In fact, the respective baffle assemblies just referred to may be actually secured to the lower portion of the pipes 62, 64 and 66 by weldment or other suitable means.

Water or coolant pipes 62, 64 and 66 are operatively connected to an inlet coolant pipe 68 and to an outlet coolant pipe 70 and wherein pipes 68 and 70 are adapted to connect within the cooling system of the associated engine (not shown) such that the heat associated with the coolant fluid being used to cool the engine can be transferred to the surrounding area within the housing means 12 of the fuel vaporizer 10 and can particularly be transferred to the respective baffle assemblies 74, 76 and 78. It follows then that the heat transferred from the coolant pipes will enhance the vaporization of certain liquid fuel droplets moving downwardly through the fuel vaporizer 10, and that those liquid fuel droplets not substantially vaporized by the heat within the fuel vaporizer 10 will be urged to the outer sides of the housing means 12 where the same fuel droplets will drop and be captured into the fuel catch basin 20.

As best illustrated in FIG. 1, the catch basin 20 is provided with an opening 80 that is communicatively connected to fuel inlet line 50 and there is provided a float actuated valve assembly 82 for opening and closing the opening 80 in response to the accumulation of fuel within the fuel catch basin 20. It is thusly seen that after a predetermined volume of fuel is present in the catch basin 20 that the float actuated valve assembly 82 will move to an upper position, causing the accumulated fuel within the catch basin 20 to drain through the opening 80 into the fuel inlet line 50 where the fuel is rerouted through the pump 44 and into the fuel supply system.

From the foregoing specification, it is seen that the fuel vaporizing apparatus of the present invention is designed to increase the efficiency of a fuel consuming engine by atomizing and/or vaporizing the fuel portion of the air-fuel mixture passing through the fuel vaporizer 10 prior to the combustion process within the associated engine. In addition, the fuel vaporizer 10 of the present invention has the capability to capture and reroute the fuel of fuel droplets not substantially vaporized and, therefore, generally assures that the fuel portion of the air-fuel mixture passing through the fuel vaporizer is in a vapor or atomized state and consequently is more volatile.

The terms "upper", "lower", "forward", "rearward", etc., have been used herein merely for the convenience of the foregoing specification and in the appended claims to describe the Liquid Fuel Vaporizer and its parts as oriented in the drawings. It is to be understood, however, that these terms are in no way limiting to the invention since the Liquid Fuel Vaporizer may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A fuel vaporizing apparatus adapted to work in conjunction with an internal combustion engine or the like to vaporize fuel and mix the same with a system of air passing therethrough to form an air-fuel mixture, said fuel vaporizing apparatus comprising:
   a. a housing means adapted to receive and channel a system of air therethrough;
   b. spray nozzle means projecting interiorly of said housing means for spraying fuel in an atomized state interiorly of said housing means wherein the fuel vapor resulting from the atomized fuel mixes with air of the system of air passing through said housing means to form an air-fuel mixture;
   c. a fuel supply system including pump means operatively connected between a source of fuel and said nozzle means for supplying fuel to said nozzle means;
   d. control means operatively connected and associated with said nozzle means for selectively controlling the quantity of fuel expelled from said nozzle means;
   e. baffle means disposed below said nozzle means and in the path of the air-fuel mixture for intercepting droplets of fuel not substantially vaporized and for urging said fuel droplets from the passing air-fuel mixture;
   f. means for capturing said fuel droplets not substantially vaporized and intercepted by said baffle means and for returning the fuel of said fuel droplets back to said fuel supply system where the same can be rerouted through said nozzle means;
   g. heating means disposed interiorly of said housing means for assisting in the vaporization of fuel passing through said housing means; and wherein said control means is operatively connected to a throttle plate that effectively controls the volumetric rate of air passing through said fuel vaporizing apparatus, and wherein said control means is responsive to the angular positioning of said throttle plate for controlling the quantity of fuel expelled from said nozzle means, and wherein said nozzle means includes a plurality of separate nozzles operatively connected to said fuel supply system and projecting interiorly of said housing means; and wherein said control means comprises a series of solenoid switches wherein each solenoid switch is operatively connected to one respective nozzle and operative to open and close the same, and a step switching mechanism operatively connected to each of said solenoid switches and responsive to the angular position of said throttle plate for activating certain solenoid switches as said throttle plate is rotated from a closed position to a completely opened position such that as the angular position of said throttle plate is changed respective solenoid switches are particularly actuated to open or close respective nozzles and to consequently vary the quantity of fuel being expelled into said housing means relative to the angular position of said throttle plate.

2. The fuel vaporizing apparatus of claim 1 wherein said throttle plate is fixed to a rotatable shaft, and wherein said step switching mechanism is operatively connected to said shaft and actuated thereby by the rotation of said shaft.

3. The fuel vaporizing apparatus of claim 1 wherein said means for capturing said fuel droplets not substantially vaporized and returning the fuel thereof back to said fuel supply system includes a fuel catch basin disposed outwardly of the central airfuel mixture passing area within said housing, and wherein said catch basin is provided with a control valve and means leading therefrom back to said fuel supply system, and wherein there is provided control means operatively connected to said valve for opening the same in response to the accumulation of a certain level of fuel in said catch basin whereby the opening of said valve in said catch basin results in the accumulated fuel therein being returned to said fuel supply system.

4. The fuel vaporizing apparatus of claim 3 wherein said means for actuating said valve in response to the accumulation of fuel within said catch basin includes a float type actuating assembly.

5. The fuel vaporizing apparatus of claim 3 wherein said baffle means is disposed between said nozzle means and said fuel catch basin and extends substantially across the entire cross sectional area of said housing means.

6. The fuel vaporizing apparatus of claim 5 wherein said heating means is disposed adjacent to and in close proximity to said baffle means for heating the same wherein the heated baffle means act to more completely vaporize portions of fuel passing through said housing means and engaging the same.

7. The fuel vaporizing apparatus of claim 6 wherein said heating means comprises a series of water pipes extending through said housing means and in close proximity to said baffle means, and wherein said water pipes of aid heating means are operative connected to a water cooling system of the associated engine utilizing the fuel vaporizing apparatus whereby the heat associated with said water is used to heat said baffle means.

8. The fuel vaporizing apparatus of claim 5 wherein said baffle means comprises a series of baffle assemblies disposed across a substantial cross sectional area of said housing means and wherein each baffle assembly is generally arcuate shaped and elevated about the central portion thereof and slopes downwardly therefrom towards said fuel catch basin such that fuel droplets not substantially vaporized tend to move towards the catch basin where the fuel thereof is recaptured.

9. The fuel vaporizing apparatus of claim 8 wherein said series of baffle assemblies comprise at least three transverse arcuate shaped baffle assemblies disposed in side-by-side relationship and wherein the centralmost baffle assembly is disposed at an elevation higher than the baffle assemblies disposed on each side thereof whereby the air-fuel mixture passing through said apparatus may pass between the respective baffle assemblies.

* * * * *